United States Patent [19]

Dugger

[11] Patent Number: 4,693,284

[45] Date of Patent: Sep. 15, 1987

[54] METHOD FOR UNDERGROUND STORAGE TANK ABANDONMENT

[75] Inventor: Michael D. Dugger, Ladson, S.C.

[73] Assignee: Petro Fill, Inc., Ladson, S.C.

[21] Appl. No.: 890,565

[22] Filed: Jul. 30, 1986

[51] Int. Cl.[4] .............................................. E02D 29/00
[52] U.S. Cl. ........................................ 141/1; 220/902; 405/272
[58] Field of Search ........................ 141/1, 5, 9, 82, 98, 141/100, 311 R; 220/1 B, 902; 405/258, 263, 272, 288, 289

[56] References Cited

U.S. PATENT DOCUMENTS

| | | | |
|---|---|---|---|
| 1,404,112 | 1/1922 | Goebl et al. | 405/258 |
| 3,850,206 | 11/1974 | Canevari et al. | 141/1 |
| 3,890,796 | 6/1975 | Kruger et al. | 141/82 X |
| 3,892,442 | 7/1975 | Janssen | 405/288 X |

OTHER PUBLICATIONS

Appendix B, NFPA 30 "Abandonment for Removal of Underground Tanks" in *Flammable and Combustible Liquids* Code 1984.

API Bulletin 1604, "Recommended Practice for Abandonment or Removal of Used Underground Service Station Tanks" (Mar. '81).

*Primary Examiner*—Henry J. Recla
*Assistant Examiner*—Mark J. Thronson

[57] ABSTRACT

An underground storage tank is treated in an expeditious, safe, and environmentally acceptable manner for the purpose of abandonment in place whereby the tank may not be re-used for its intended purpose which treatment involves completely filling the interior of the storage tank with a rigid polyurethane foam.

12 Claims, No Drawings

METHOD FOR UNDERGROUND STORAGE TANK ABANDONMENT

BACKGROUND OF THE INVENTION (1) Field of the Invention

This invention relates to a method for abandoning (in place) used underground storage tanks, which have contained gasoline or other flammable liquids, in an expeditious, safe, and environmentally acceptable manner.

(2) Description of the Prior Art

Storage tanks which have stored flammable liquids must be handled with extreme care when abandoned, removed, moved, or stored. This is particularly true of underground storage tanks at service stations which are most frequently used for the storage of motor fuel and for the storage of other flammable or combustible liquids such as crankcase drainings (which may contain some gasoline).

The conventional practice for the abandonment, removal, storage, placing temporarily out of service, and sale of used underground tanks which have contained gasoline or other flammable liquids is that which is set forth as operating procedures in API (American Petroleum Institute) Bulletin 1604, entitled "Recommended Practice for Abandonment or Removal of Used Underground Service Station Tanks," which teaching is incorporated by reference herein.

The importance of the prevention and detection of product leakage from petroleum storage and dispensing systems has been attested recently by Congressional action banning future underground installations of bare metal tanks. In addition, Congress has mandated identification of specified bare metal (all steel) underground storage tanks, testing said tanks for leakage, and, ultimately, removing or abandoning faulty tanks.

The safe removal of underground storage tanks may be required if it appears that a significant amount of product (a regulate substance) has leaked from it. Of course, in view of the amount of excavation required, removal is usually a very labor intensive process and, therefore, very expensive. Upon removal of all flammable liquid which can be pumped out of the tank, excavation down to the top of the tank is necessary to remove the fill tube and disconnect the fill, gauge, product, and vent lines. The open ends of lines which are not to be used further are plugged or capped. All tank openings must be temporarily plugged, excavation is completed, and the tank is removed, which involves a heavy duty crane. Since the tanks can no longer be re-used as is, they normally are cut up and sold as scrap iron. However, since it is difficult to completely remove all hazardous material (or regulated substance) from the scale or sediment in the tank, it is becoming more and more difficult to find salvage yards willing to receive such "scrap" and assume responsibility for accounting for these materials.

When abandonment of the underground storage tank is an available option, it also is a costly, labor intensive process, as conventionally practiced. As in removal, upon pumping out all flammable liquid which can be pumped out, excavation down to the top of the tank is required. The fill (or, drop) tube is removed, and the fill, gauge, and product lines are disconnected. The vent line, however, remains connected until the tank is filled to permit emission of flammable vapors. Upon removal of remaining regulated substances, one or more large holes must be made in the tank top. Of course, if any flammable vapors remain in the tank, the manner in which such a hole is made can present an explosion hazard. For instance, API Bulletin 1604 suggests making the hole with a couple of blows from a backhoe. This could, however, create sparks and ignite any flammable gases. Also, an explosion hazard is presented if the hole is made with a cutting torch.

The hole, or holes, is provided for the introduction into the tank of a suitable, solid, "inert" material. Since the tank is being abandoned in the ground, it must be filled to avoid caving in at a later date upon deterioration of the metal tank walls. The materials employed to date for this purpose are sand, sand and earth fill, and cement. Of course, with any of these materials it is almost impossible to achieve a complete fill in view of the rounded tank top. Sand is introduced dry as long as it flows freely, but it tends to pile and form a cone at the point of introduction. When the cone nears the tank top, the API recommended practice is to wash the sand into the tank with a nominal amount of water, causing it to puddle and flow to the ends of the tank. In order for this water to drain from the tank, several holes are driven into the bottom of the tank prior to introduction of the fill material. This presents two concerns. First, the use of large amounts of water should be avoided since the tank might be filled with water before it is filled with sand. And, second, in the event all of the regulated substance was not effectively removed from the tank, this procedure actually causes the release of the hazardous substance into the groundwater system, which is what the procedure purports to prevent. More nearly complete filling is suggested by first filling the tank with sand to approximately 80% capacity, mixing soil and water to make a free-flowing mud, and finally pouring the mixture into the tank opening and puddle. The third conventional alternative fill material, cement (with or without aggregate) due to its thixotropic consistency may be even more difficult to use and achieve a near complete fill. When the tank is filled to the greatest possible extent, the vent line can be disconnected and capped. Finally, the excavated area above the filled tank is filled in and smoothed over, which may involve pouring a new concrete surface.

The above discussed conventional techniques for abandoning underground storage tanks to place them in a condition such that they may never be re-used present a number of disadvantages. Often, in order to facilitate the flow of the fill material through a hole in the top of the tank, a make-shift hopper may be employed. This hopper is usually constructed of sheet metal. The movement of sand particles against the metal hopper on their way into the tank may cause a build-up of static electricity which could result in a spark entering the tank, risking a chance of an explosion if any flammable vapors remain. Also, it may be possible to vacuum out sand fill, repair the fill hole, reconnect the disconnected and capped lines, and re-use the tank. In the event that an abandoned tank had to be removed at a later time, either to comply with regulatory authority or to permit a specific land use, a tank of even average size ($\sim 10,000$ gallons) filled with sand, sand and earth fill, or concrete would require an extremely heavy duty crane to lift it out of the ground. Once removed, disposal of the filled tank becomes an even bigger problem than it is for an empty tank. These concerns are in addition to the costs of such abandonment techniques referred to above.

BRIEF STATEMENT OF THE OBJECTS OF THE INVENTION

Therefore, it is an object of this invention to provide a method of abandoning underground storage tanks in a novel, expeditious, safe, and environmentally acceptable manner which avoids the disadvantages associated with the conventional techniques as cited above. It is a particular object of this invention to provide a method of abandoning underground storage tanks in place without the requirement for any excavation work, and, therefore, without the necessity of refilling or repair and replacement of any surface improvements which would otherwise be damaged by such excavation. Specifically, it is an object of this invention to provide a method of abandoning underground storage tanks in such a manner as to permanently render them inoperative without the necessity of plugging or capping the tank's associated piping (fill, gauge, vent, and product lines) "below grade." More specifically, it is an object of this invention to provide an underground tank abandonment procedure which eliminates many of the safety hazards presented by conventional practices, in particular to render the tank "explosion proof."

It is a further object of this invention to provide a method of abandoning underground storage tanks which method can be practiced by a minimum number of personnel in a minimum amount of time, thereby dramatically reducing labor costs normally associated with underground tank abandonment. Also, it is an object of this invention to provide a method of underground tank abandonment which, in the event that a tank which has been treated by such method should have to be removed subsequently, removal and disposal of same is facilitated by providing a fill material which is lightweight and has a separate application for which it is readily marketable.

SUMMARY OF THE INVENTION

The above objects are met in the instant invention of a novel method of treating underground storage tanks in an expeditious, safe, and environmentally acceptable manner for the purpose of abandonment in place whereby the tank may not be re-used for its intended purpose which method involves completely filling the interior of the storage tank with a rigid polyurethane foam.

DESCRIPTION OF THE PREFERRED EMBODIMENTS

Prior to filling the tank, all regulated substances should have been removed by conventional tank treating methods, such as pumping, evacuation, and/or evaporation by forced air ventilation. After the tank has been located and all its connecting lines have been identified, the fill process preferentially is preceded by a minor amount of solid absorbent materials to absorb any condensation, water, mud, or sludge that might have been left in the tank after removal of the regulated substance. This will insure a complete, tight fill with no voids on the very bottom of the tank. The preferred materials for this purpose are inorganic, powdered or granular, solid, high surface area, petroleum absorbent materials, such as sodium silicate (or other silica materials) or a powdered rock material.

The tank then receives the required amount of polyurethane foam generating chemicals, based on the volume capacity of the underground storage tank, such that, upon expansion and "curing" (or "cream") of the foam from the liquid to the solid state, the tank and all its connecting lines are completely and tightly filled. The fill process for an average 10,000 gallon tank may take approximately four to six hours from the beginning of the filling process. This fill rate can be increased to a more rapid rate depending on the size of the project. Except for relatively small tanks, however, the fill process is not continuous. Since the cream time is relatively short (30–90 seconds) for the foam material and due to the exothermic nature of the curing process (reaction), it is usually necessary to fill the tank in a number of "shots," permitting time between applications for the foam to expand, harden and cool.

It is not necessary to seal any of the connecting lines to the tank before the fill process begins. Any connecting line of approximately four inches diameter can be used for introducing the foam materials into the tank. There must, however, be a second open line connected to the tank during the fill process to permit release of the air/flammable gases from the tank. Upon filling the tank with the polyurethane foam, any pre-existing flammable gases have been eliminated from the tank, and it has been rendered explosion proof.

After the fill process is complete, all filled lines (inlet, suction/vent, gauge, product, and fill) are cleaned and sealed with a sealing compound. Each line then is threaded and capped with an appropriate size cap which is color coded, and each line is tagged for future reference.

The foam generating chemicals employed in the invention process produce a polyurethane resin, which may be described as a two-component, rigid, closed-cell, polyether urethane foam. These materials are described in U.S. Pat. Nos. 3,219,598 and 3,359,217, which teaching is incorporated by reference herein. Such foams are commercially available in component form from various chemical manufacturers under their respective trademarks. Such products are sold in two component form, and the components are known simply as component A and component B. One of the components is basically an isocyanate (A), and the other is a polyol resin (B). Such products may utilize various additional materials including flame retardants, depending on the use to which the foam is being put and on the manner of its application. For the purposes of this invention, an additional material is a volatile liquid fluorocarbon, such as dichlorodifluoromethane, commercially available under the trademark "Freon," or trichlorofluoromethane. An important characteristic of such volatile liquid fluorocarbons is to boil at approximately the ambient temperature, so that a slight positive pressure differential will maintain the material in its liquid state, but upon release of the foam into the atmosphere, the absence of the pressure differential, together with the heat resulting from the chemical reaction of the two components, permits the boiling and rapid expansion of the liquid fluorocarbon, thus producing an air-entrained foam end product.

From the onset of the creaming to the end of the rise during the expansion process, the gas is retained completely in the form of bubbles which ultimately result in the closed cell structure. Addition of surfactant facilitates the production of a very small uniform bubbles necessary for a fine cell structure. The most effective surfactants are polyoxyalkylene-polysiloxane copolymers which have been specifically designed for rigid foam. Catalysts include tertiary amines and certain organotin compounds, such as dibutylin dilaurate.

Rigid polyurethane foams which are suitable for the invention process are those rigid polyurethane foams which are used mainly for insulation. (Most insulation is applied in building and construction, and also in refrigeration and transportation. *Modern Plastics* (January 1982) reported that, in 1981, 23,000 tons of polyurethane foam was used as exterior insulation on above-ground tanks and piping.) Applicators can buy formulated chemical systems consisting of isocyanate and polyol components designed to produce foam of the desired density and properties in commericial spraying, pouring, or frothing equipment. Almost all rigid polyurethane foam is produced from polymeric isocyanates. Polyols of choice include propylene oxide adducts of polyfunctional hydroxy compounds (pentaerythritol, sorbitol, -methylglucoside, sucrose, phenol-formaldehyde resins, and others) and propoxylated polyfunctional amino alcohols, diamines, and Mannich bases. Construction standards in insulation applications of polyurethane foam often necessitate the addition of flame retardants. Although the foam material will be buried underground encased in a steel shell upon filling the underground storage tank which severely limits opportunities for coming into contact with any flame, extra precaution may be taken by adding flame retardants to the polyurethane formulation. Flame retardants contain phosphorus or halogen and may be inert or contain reactive hydroxyl groups. The reactive products are permanently incorporated into the polymer matrix. The most commonly used reactive flame retardants include diethyl N,N-bis(2-hydroxyethyl)aminomethylphosphonate and tetrabromophthalate esters. Nonreactive flame retardants include halogenated pholphate esters and highly halogenated aromatic compounds. A particular preferred polyurethane foam material for filling underground storage tanks is such a material which meets Military Specification MIL-P-21929B, Aug. 11, 1969, as amended by Amendment 1, 22 June 1970.

A preferred rigid polyurethane formulation is provided in Table I.

TABLE I

| Rigid Polyurethane Formulation | |
|---|---|
| Ingredient | Parts |
| polymeric isocyanates | 140 |
| polyol[a] | 100 |
| catalyst[b] | 2 |
| trichlorofluoromethane | 11 |

[a]Sucrose- or sorbitol-based polyether polyol with a hydroxyl number of 450.
[b]Mixture of dibutylin dilaurate and tertiary amines.

Another preferred polyurethane material is the more recently developed urethane-modified rigid polyisocyanurate foam which exhibit superior thermal stability and combustibility characteristics. Control of component temperature in combination with polyol and catalyst selection has led to the development of polyisocyanurate bun, laminate, pour-in-place, and spray foams which are in all respects comparable to polyurethane foams but are stable up to 150° C.; they do not require added flame retardants to meet most regulatory requirements. A typical polyisocyanurate-foam formulation is shown in the following Table II.

TABLE II

| Typical Rigid Polyisocyanurate Formulation | |
|---|---|
| Ingredient | Parts |
| polymeric isocyanates | 134 |
| polyol | 20 |
| catalyst[a] | 5 |
| surfactant | 2 |
| trichlorofluoromethane | 11 |

[a]3:2 mixture of Curithane 52 and Curithane 51 (The Upjohn Company catalysts developed especially for the preparation of polyisocyanurate foams).

Polyurethane foam presents an excellent fill material from an environmental aspect, as well as for health and safety factors. Kirk-Othmer's *Encyclopedia of Chemical Technology*, 3rd Edition (1983), Volume 23, notes "Fully cured polyurethanes present no health hazard; they are chemically inert and insoluble in water and most organic solvents." That publication further notes that the artificial heart currently under investigation in several countries and used in one patient in the U.S. is constructed from thermoplastic polyurethane elastomers.

The two-component polyurethane foam is introduced into the tank via a dispenser for mixing and dispensing the ingredients for producing the polyurethane foam material. The mixing and dispensing assembly, along with associated connections, hoses, pumps (to move the two components separately to the mixing chamber within the housing of the mixing and dispensing assembly), and various valves and pressure gauges may resemble those described in U.S. Pat. No. 3,451,786, which teaching is incorporated herein, although this teaching is directed more to an in-plant foam application than a field use. Mixing and dispensing assemblies which may be advantageously employed in the invention process are available commercially from Graco Inc., Minneapolis, Minn. In particular, Graco's Model 207-388 with mixing assembly Model 207-389 or static mixer control Model 207-861 with compatible mixing assembly may be used.

In order to facilitate dispensing of the combined and mixed foam generating chemicals within the underground storage tank, a PVC (polyvinyl chloride) tube of appropriate length is attached to the dispensing outlet of the assembly. A metal tube may be effectively employed for accurate delivery, but may generate sparks (caused by static electricity) upon metal-to-metal contact within the tank and present an explosion hazard.

During the filling process, at least one opening into the tank in addition to the hole used for filling should remain open as a vent hole to allow the escape of air displaced by the rising foam. A moderate degree of overpacking is advantageous to cause the rising foam both to completely and tightly fill the tank, thus sealing any leaks, as well as to cause the rising foam to travel up the connecting pipes, completely sealing them off and eliminating reuse. Therefore, it is preferable to keep open all connecting lines to the tank during the fill process. Upon completion and curing of the foam, any material extruded through the top of these connecting lines can be cut (or sawn) away, permitting the pipes to be threaded and capped above grade. The complete and tight nature of the fill permanently eliminates the possibility of residual flammable gases within the storage tank.

In the event that it should become necessary in the future to remove the tank, either as a result of a regulatory requirement or alternate land use, the foam filled tank can be lifted out of the ground much easier and at less expense than if the tank had been filled with sand, sand and earth fill, or concrete. Moreover, upon removal of the tank shell by cutting it into manageable pieces with high powered saws, the foam material is marketable as flotation foam for use in barges, tankers, or other marine vessels, as well as for floating docks.

While the invention has been described with respect to the generation of polyurethane froth foams, and particular mention has been made of the dispensing equipment of a single manufacturer, it is to be understood that the invention method is not limited to the utilization of the products or chemicals of any single manufacturer, but is generally utilizable with the products of any manufacturer in accordance with the recommendations of the manufacturer, to practice the invention method.

What I claim is:

1. A method of abandoning an empty used underground storage tank and rendering the underground tank unusable for the storage of any liquid material, the method comprising the steps of introducing polyurethane foam material into the underground tank and allowing the polyurethane foam material to become rigid whereby the polyurethane foam material substantially completely and tightly fills the underground tank and any of its connecting lines, the method being performed without creating or requiring a large hole in the underground tank.

2. The method of claim 1 wherein the polyurethane foam material is a two-component system comprising a component A and a component B.

3. The improved method of claim 2 wherein component A is an isocyanate and component B is a polyol resin.

4. The improved method of claim 3 wherein the two-component system additionally includes a fluorocarbon.

5. The improved method of claim 4 wherein the fluorocarbon is selected from the group consisting of dichlorofluoromethane and trichlorofluoromethane.

6. The method of claim 1 wherein the rigid polyurethane foam material is prepared from a formulation comprising 140 parts polymeric isocyanates, 100 parts polyol, 2 parts surfactant, and 11 parts trichlorofluoromethane.

7. The method of claim 1 wherein the rigid polyurethane foam material is urethane-modified rigid polyisocyanurate foam.

8. The improved method of claim 7 wherein the urethane-modified rigid polyisocyanurate foam is prepared from a formulation comprising 134 parts polymeric isocyanates, 20 parts polyol, 5 parts catalyst, 2 parts surfactant, and 11 parts trichlorofluoromethane.

9. A method of abandoning a used underground liquid storage tank, the method comprising the steps of
(a) removing therefrom any liquids present in the underground tank and
(b) introducing polyurethane foam generating chemical material into the underground tank until, by the process of the polyurethane foam generating chemical material expanding and curing, the underground tank and any of its connecting lines is substantially completely and tightly filled,
the method being performed without creating or requiring a large hole in the underground tank.

10. The method of claim 9 wherein the fill process step (b) is preceded by introducing an inorganic, petroleum-absorbent material into the underground storage tank.

11. The method of claim 10 wherein the polyurethane foam generating material is introduced into the underground storage tank through existing piping at a surface location and said piping is also filled.

12. The method of claim 11 wherein: the piping is selected from the group consisting of inlet, suction/vent, gauge, product, and fill lines and combinations thereof; the inorganic, petroleum-absorbent material is selected from the group consisting of silica material and powdered rock material; and, the polyurethane foam generating chemical material is a two-component system comprising an isocyanate and a polyol resin including a fluorocarbon.

* * * * *